(12) United States Patent
Walach (10) Patent No.: US 6,230,656 B1
(45) Date of Patent: May 15, 2001

(54) ROLLABLE PET CARRIER AND METHOD OF USE

(76) Inventor: Christopher E. Walach, 4075A Owlshead Ct., Irwin, CA (US) 92310

( * ) Notice: Subject to any disclaimer, the term of this patent is extended or adjusted under 35 U.S.C. 154(b) by 0 days.

(21) Appl. No.: 09/335,848

(22) Filed: Jun. 14, 1999

Related U.S. Application Data (60) Provisional application No. 60/106,209, filed on Oct. 30, 1998.

(51) Int. Cl.[7] .................................................. A01K 1/00
(52) U.S. Cl. ........................................ 119/496; 119/453
(58) Field of Search .................................. 119/496, 497, 119/453, 454; 190/195

(56) References Cited

U.S. PATENT DOCUMENTS

| | | | |
|---|---|---|---|
| 823,544 | * | 6/1906 | Parker . |
| 2,790,414 | * | 4/1957 | Rossow . |
| 3,785,344 | * | 1/1974 | Patterson ................................ 119/453 |
| 3,805,929 | * | 4/1974 | Kuwayama .......................... 190/18 A |
| 4,561,526 | * | 12/1985 | Winter et al. ......................... 190/115 |
| 4,575,109 | * | 3/1986 | Cowdery ................................. 280/37 |
| 4,852,520 | * | 8/1989 | Goetz ..................................... 119/497 |
| 4,966,259 | * | 10/1990 | Bergman .............................. 190/18 A |
| 4,989,744 | * | 2/1991 | Tominaga .............................. 220/339 |
| 5,113,793 | * | 5/1992 | Leader et al. ......................... 119/453 |
| 5,330,037 | * | 7/1994 | Wang .................................... 190/18 A |
| 5,484,046 | * | 1/1996 | Alper et al. ........................... 190/115 |
| 5,630,521 | * | 5/1997 | Waddell et al. . |
| 5,701,843 | * | 12/1997 | Lazides ................................. 119/496 |

* cited by examiner

Primary Examiner—Charles T. Jordan
Assistant Examiner—Yvonne R. Abbott
(74) Attorney, Agent, or Firm—Timothy Thut Tyson; Ted Masters; Freilich, Hornbakers& Rosen

(57) ABSTRACT

A pet carrier (20) includes a cage like enclosure (22) having a top (24), a bottom (26), a front end (28), and an opposite rear end (30). Two spaced wheels (32) are connected to the cage like enclosure at the bottom rear end so that when the front end is lifted off of a support surface (500), the pet carrier can be rolled. A handle (34) is pivotally connected to the cage like enclosure at the top near the front end. The handle is selectively lockable in a plurality of angular positions allowing the height of the handle to be adjusted to accommodate users of different heights.

10 Claims, 7 Drawing Sheets

Fig. 10

ROLLABLE PET CARRIER AND METHOD OF USE

CROSS REFERENCE TO RELATED APPLICATION

This application claims the benefits under 35 U.S.C. Section 119(e) of U.S. Provisional Application No. 60/106,209 filed Oct. 30, 1998.

TECHNICAL FIELD

The present invention pertains generally to devices for transporting pets, and in particular to a pet carrier that can be rolled.

BACKGROUND ART

Portable pet carriers are well known in the art. These devices are used to transport a pet, such as a dog or cat, from one place to another. Pet carriers provide a safe shelter for the pet during an airplane flight, on a trip to the veterinarian, on a trip to the groomers, going to pet shows, or in any other instance where it may not be practical to hold the pet on a leash or let the pet run free. For example, U.S. Pat. No. 4,171,683 shows an integrated modular assembly facilitating cohabitation with house pets, particularly cats and dogs, who normally live under conditions of semi-freedom in the lodgings of their masters. The assembly includes a movable support which may even be transportable, and a collection of interchangeable modules carried by the support and fulfilling a number of useful functions for the pet, such as exercise, territorial refuge, vital comforts, etc. U.S. Pat. No. 4,852,520 illustrates a portable pet carrier having a lower section and a removable upper section. The lower section has a bottom wall, spaced side walls, a rear wall, and a front wall with an access opening. The upper section has a top wall, spaced side walls, a rear wall, and a front wall with an access opening. A plurality of rollers are carried on the exterior of the bottom wall of the lower section. U.S. Pat. No. 5,113,793 shows a mobile pet carrier having a cage like enclosure mounted on a specially designed carriage with wheels for holding and transporting the enclosure. The carriage has a handle to make pushing easy for the pet owner. U.S. Pat. No. 5,283,962 discloses a portable calf dryer apparatus comprising a wheeled container having two compartments: a calf receiving compartment for drying and warming a calf, and a heater unit storing compartment for housing either a battery operated or electrically powered heater unit which generates heated air. U.S. Pat. No. 5,701,843 illustrates a pet mobile. The device comprises a pet carrier with adequate ventilation for even a large animal. The carrier has a handle which can be folded to conserve space and four retractable wheels which can be placed in a down position when moving the carrier with the pet inside. U.S. Pat. Des. 334,087 shows a pet carrier with five wheels and Des. 367,733 shows a pet carrier without wheels.

DISCLOSURE OF INVENTION

The present invention is directed to a portable pet carrier which can be rolled along a support surface, rather than having to be lifted and carried. The pet carrier comprises a cage like structure of similar construction to conventional pet carriers. Two wheels are located near the bottom rear of the pet carrier, so that when the front mounted handle of the pet carrier is lifted slightly, the pet carrier may be conveniently rolled in a forwardly direction. The wheels are flush mounted with the rear and sides of the pet carrier. It is noted that it would be inappropriate to lift the front of the pet carrier too much, since the pet would then reside on a significantly sloping surface. The handle is pivotally located near the top front of the pet carrier, and is lockable in various angular positions. By adjusting the angular position of the handle, the height of the handle above the floor or other support surface is resultantly adjusted. This height adjustment feature allows the handle to be positioned so that it can be comfortably grasped by the downwardly extending hand of any user. It may be appreciated that in a normal standing position with the arms fully downwardly extended, the hands of different individuals are at different heights above the floor (shorter people generally nearer to the floor, and taller people generally further from the floor). Therefore, the angular adjustment feature of the present invention accommodates a range of users, so that the user can roll the pet carrier in comfort while maintaining a fully extended arm. In other words, the user neither has to bend over, nor hold the arm in an awkward bent position. In a preferred embodiment, the angular position of the handle is adjusted so that the handle is about one-half to two inches below the normal grasp of the hand with the user standing and the arm fully downwardly extended. Therefore, when the user reaches downward and grasps the handle, and then straightens, the front of the pet carrier will be about one-half to two inches off of the floor.

The present invention also includes two spaced feet disposed on the bottom near the front end, the feet each having a forward facing bevel. When the pet carrier is rolling, the bevels serve to mitigate any inadvertent contact with obstructions such as door thresholds, floor or pavement irregularities, and the like. The feet and the wheels extend the same distance downward from the bottom, so that when stationary, the pet carrier will sit level on the support surface. When not being used to transport a pet, the pet carrier can also be utilized as sleeping quarters, a dog house, or an outdoor pet shelter. The pet carrier may also come in a plurality of different sizes to accommodate different size pets.

In accordance with a preferred embodiment of the invention, a pet carrier includes a cage like enclosure having a top, a bottom, sides, a front end, and a rear end. Two wheels are located at the bottom rear end, so that the pet carrier can be rolled in the direction of the front end. A handle is pivotally connected to the enclosure at the top front end. The handle is selectively lockable in a plurality of angular positions.

In accordance with an important aspect of the invention, the handle can be locked in positions ranging from about vertical to about 60° forward of vertical.

In accordance with an important feature of the invention, the handle is lockable in angular increments, such as every 15°.

In accordance with another important aspect of the invention, two spaced feet are disposed on the bottom near the front end, each of the feet having a forward facing bevel. In the at rest position, the pet carrier rests on the two feet and the two wheels, which extend an equal distance down from the bottom.

In accordance with another important feature of the invention, at least one attachment device, such as a cargo ring, is disposed on the cage like enclosure for securing the pet carrier to a support structure, for example, to keep the pet carrier from moving about in the cargo compartment of an airplane.

Other features and advantages of the present invention will become apparent from the following detailed

MODES FOR CARRYING OUT THE INVENTION

Figure 1:
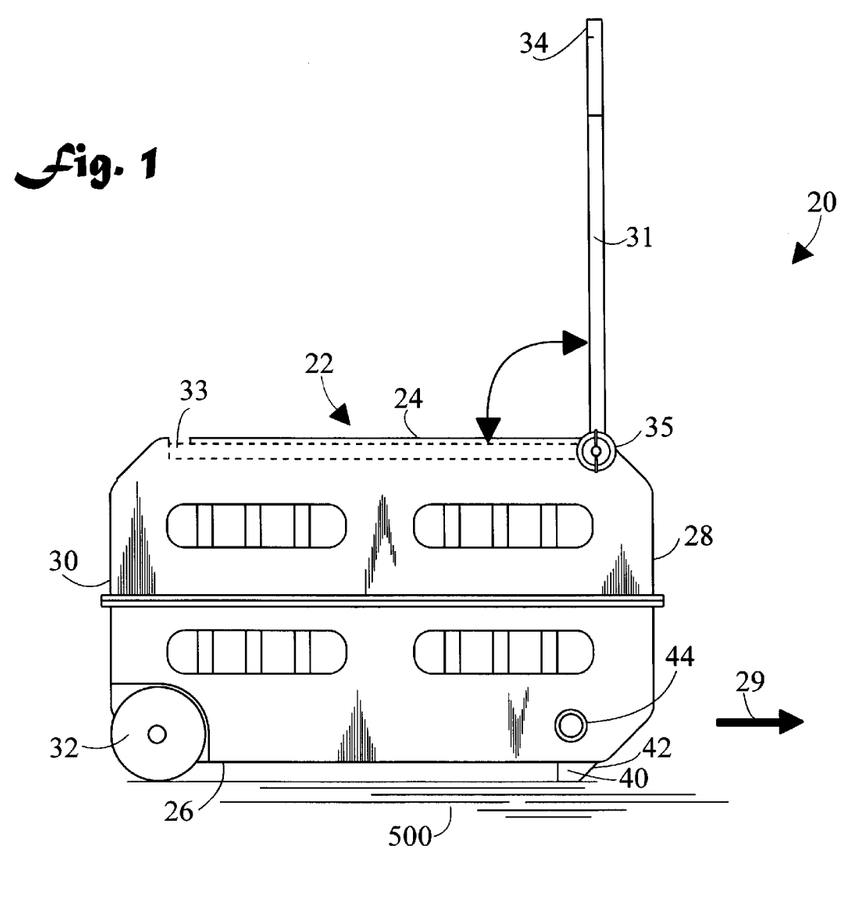
FIG. 1 is a side elevation view of a pet carrier in accordance with the present invention.
Figure 2:
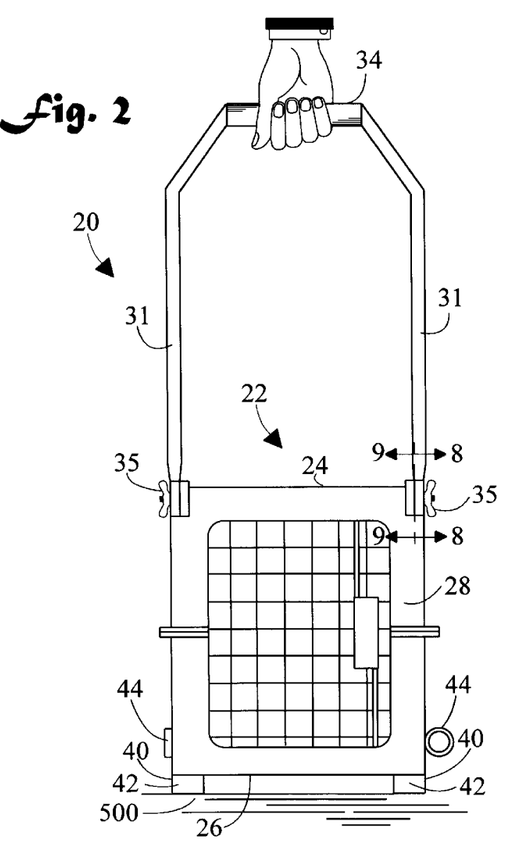
FIG. 2 is a front elevation view of the pet carrier.
Figure 3:
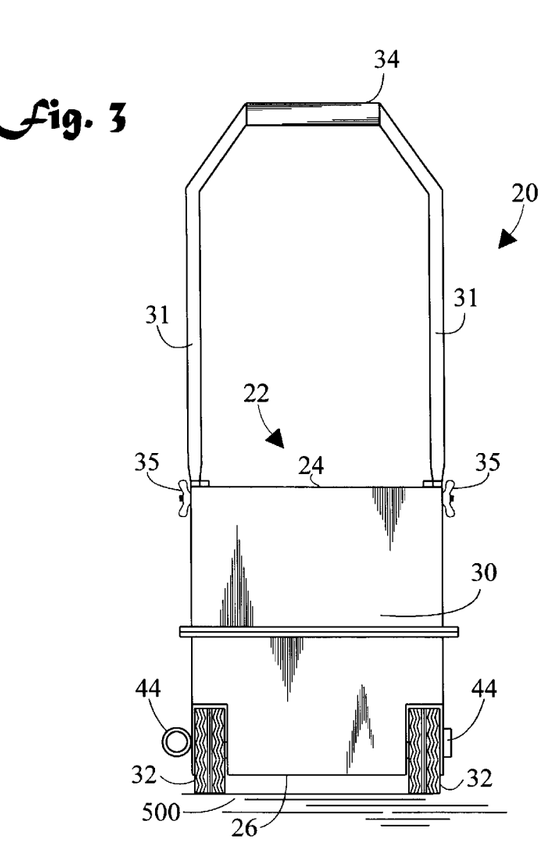
FIG. 3 is an rear elevation view of the pet carrier.
Figure 4:
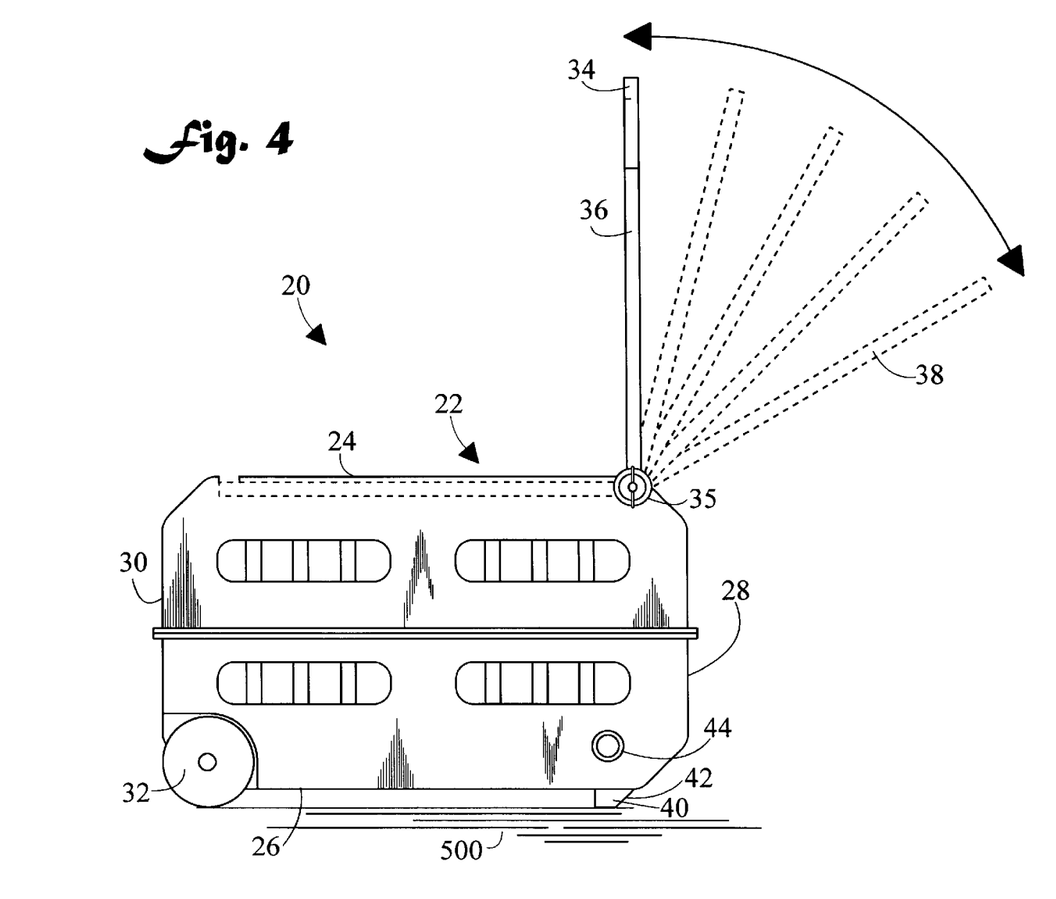
FIG. 4 is a side elevation view showing a handle in a plurality of lockable positions.

Referring initially to FIGS. 1, 2, and 3, there are illustrated side elevation, front elevation, and rear elevation views, respectively, of a rollable pet carrier in accordance with the present invention, generally designated as 20. And, FIG. 4 is a side elevation view of pet carrier 20 showing a handle in a plurality of lockable positions. Pet carrier 20 includes a cage like enclosure 22 having a top 24, a bottom 26, a front end 28, and an opposite rear end 30. Two spaced wheels 32 are connected to cage like enclosure 22 near both rear end 30 and bottom 26, so that pet carrier 20 is rollable along a support surface 500 in direction 29. A handle 34 having support arms 31 is pivotally connected to cage like enclosure 22 near both front end 28 and top 24. Handle 34 is selectively lockable in a plurality of angular positions. A locking device 35, locks handle 34 and support arms 31 in the plurality of angular positions. Handle 34 can also be pivoted and stowed on top 24 of pet carrier 20 in position 33. In a preferred embodiment, the lockable angular positions range from about vertical 36 to about 60° forward of vertical 38. Also, in a preferred embodiment the plurality of angular positions are in angular increments of about 15° as is shown in FIG. 4, however other angular increments, or a continuum of lockable angular positions are also possible.

Two spaced feet 40 are disposed on bottom 26 near front end 28, the feet 40 each having a forward facing bevel 42. Bevel 42 assists pet carrier 20 in riding over inadvertently encountered obstructions such as door thresholds. The two wheels 32 and the two feet 40 extend downward from bottom 26 substantially equal distances, so that when pet carrier 20 is stationary, the bottom rests level on a support surface 500. In a preferred embodiment, feet 40 are fabricated from rubber. At least one attachment device 44 is disposed on the cage like enclosure 22 for securing the pet carrier 20 to a support structure, such as in the cargo hold of an airplane. In a preferred embodiment attachment device 44 is in the form of a cargo ring.

Figure 5:
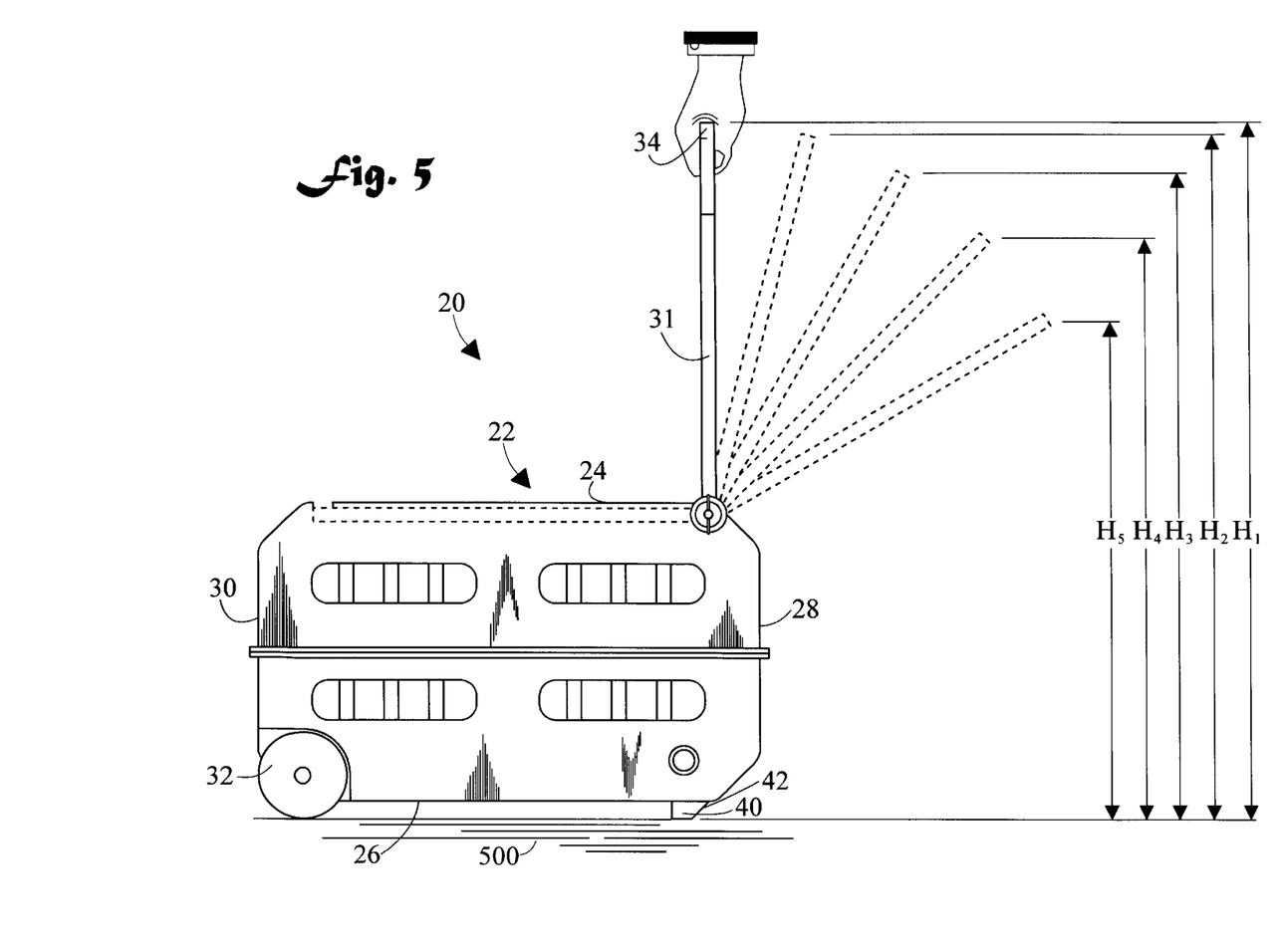
FIG. 5 is a side elevation view showing the handle selectively positioned to adjust the height of the handle above a support surface.

FIG. 5 is a side elevation view of pet carrier 20 showing handle 34 selectively positioned to adjust the height of the handle 34 above support surface 500. As handle 34 is moved angularly forward, the height of handle 34 above support surface 500 decreases. In a vertical position the height is $H_1$. When rotated forward 15°, the height is $H_2$. Similarly, the heights for 30°, 45°, and 60°, are $H_3$, $H_4$, and $H_5$, respectively. Therefore the height of handle 34 may be adjusted by rotating handle 34 to accommodate both tall and short persons. Locking device 35 locks handle 34 at the desired angle and therefore the desired height above the support surface 500.

Figure 6:
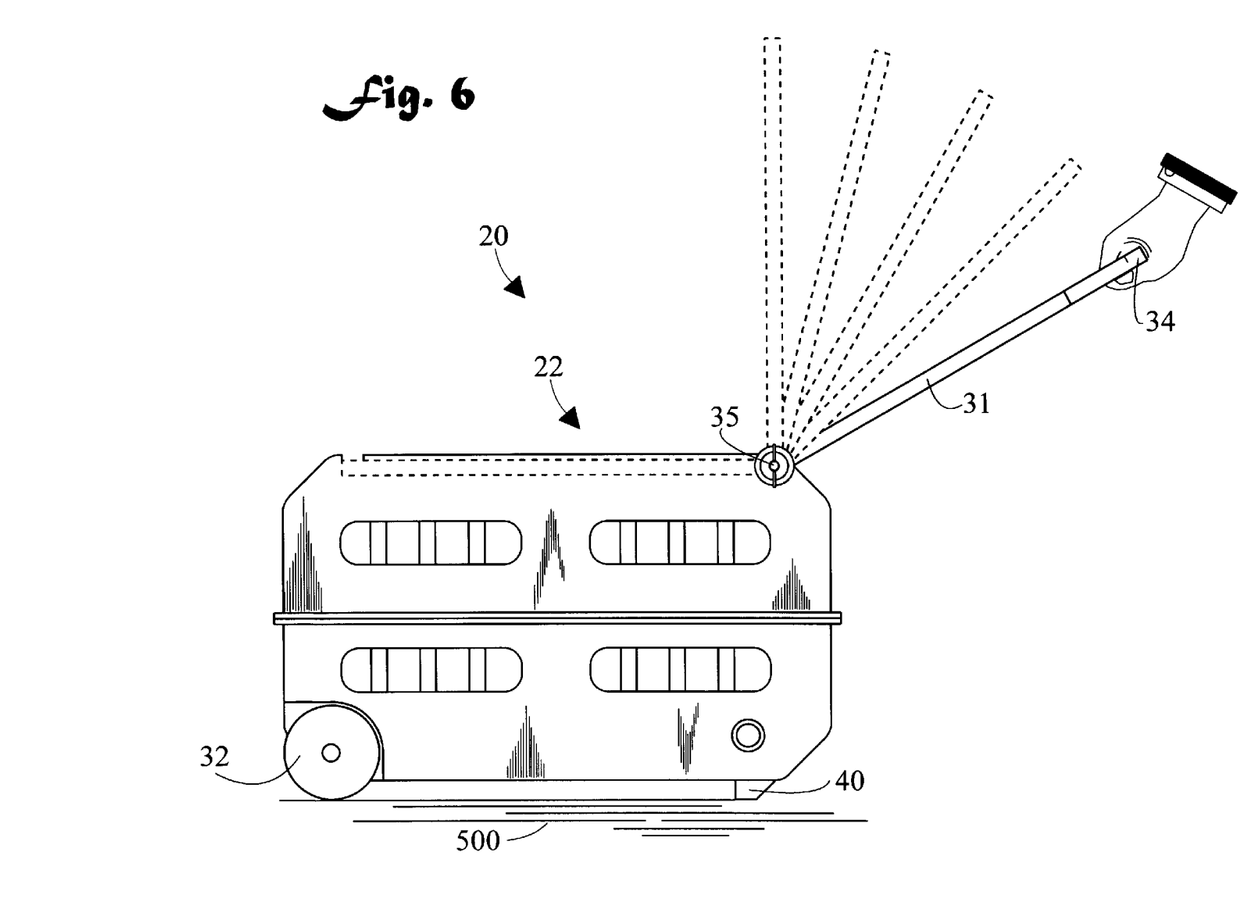
FIG. 6 is a side elevation view showing a user gripping the adjusted handle.

FIG. 6 is a side elevation view of pet carrier 20 showing a user gripping the adjusted handle 34. In this case, handle 34 has been rotated forward 60° and locked in place with locking device 35. This adjustment would generally be best for a shorter person.

Figure 7:
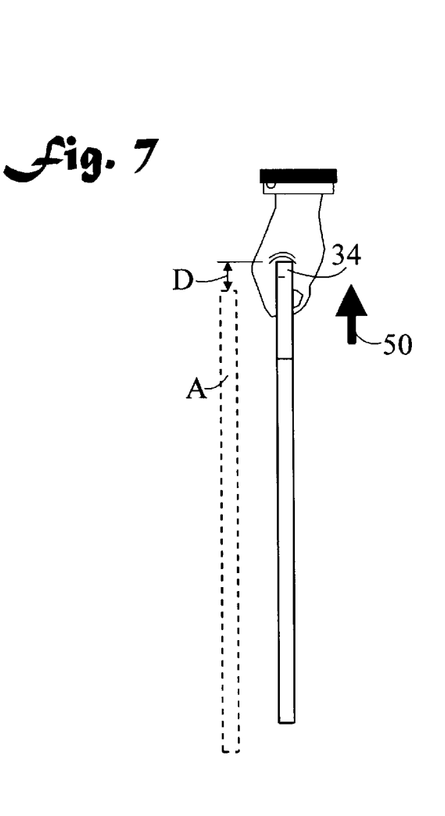
FIG. 7 is a side elevation view showing a user gripping the handle.

FIG. 7 is a side elevation view of the handle 34 of pet carrier 20 showing a user lifting the handle. To the left, represented in dotted outline A, is the position of the handle when it is not lifted and the front of the carrier is on the support surface. The height of the handle 34 was adjusted in the position represented by dotted outline A so that the height was a predetermined distance D below the normal grasp of the hand of the standing user with the arm fully down. In the preferred adjustment, distance D is about one-half to two inches below the normal grasp of the hand of the standing user with the arm fully downwardly extended. When the user grasps the handle 34 and straightens in direction 50, handle 34 and, consequently, the front end 28 and the feet 40 of the pet carrier 20 are lifted slightly off of the support surface 500 making rolling possible. (refer also to FIG. 10).

Figure 8:
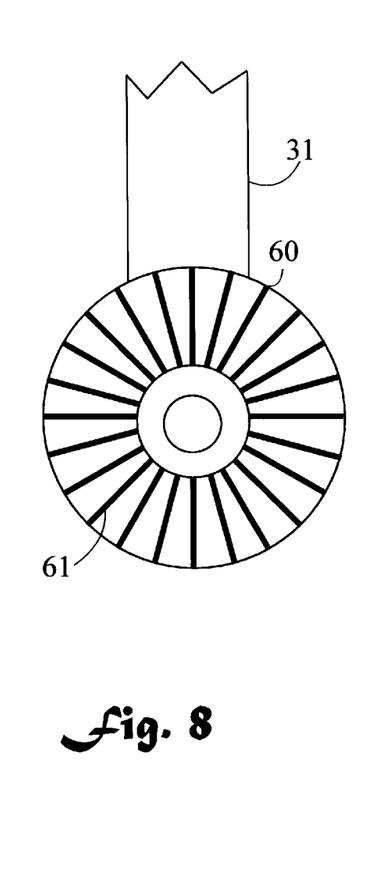
FIG. 8 is an enlarged cross sectional view of a locking device along the line 8—8 of FIG. 2.
Figure 9:
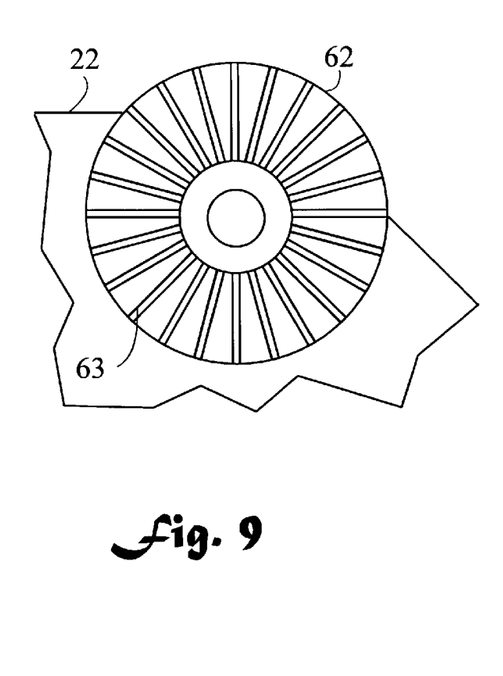
FIG. 9 is an enlarged cross sectional view of a locking device along the line 9—9 of FIG. 2; and, FIG. 10 is a side elevation view of a user lifting the handle and rolling the pet carrier.

FIGS. 8 and 9 are enlarged cross sectional views of locking device 35 along the lines 8—8 and 9—9 of FIG. 2, respectively. In one possible embodiment, locking device 35 includes a wing nut which selectively clamps together or releases two cooperating radial members. Radial member 60 is connected to handle arm 31 and includes a plurality of angularly spaced radial ridges 61, and radial member 62 is connected to enclosure 22 and includes a plurality of angularly spaced radial grooves 63 which accept the radial ridges 61. It may be appreciated that other locking devices could also be utilized to achieve the same effect.

Figure 10:
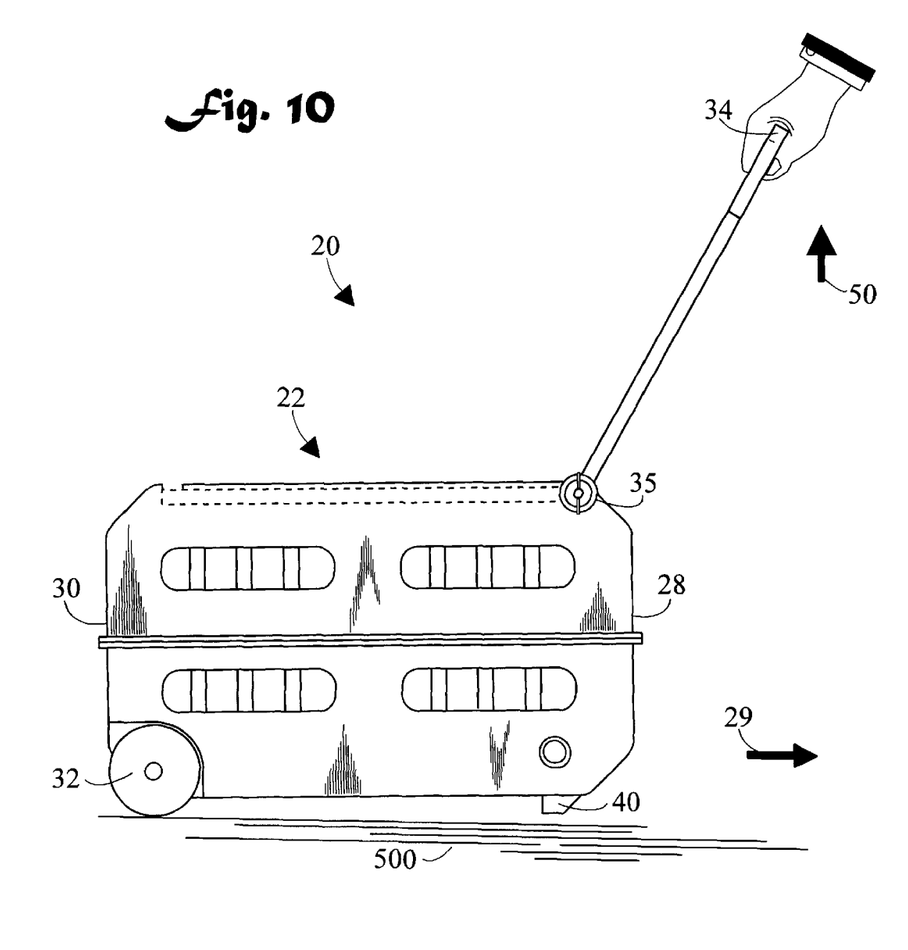

FIG. 10 is a side elevation view of a user lifting handle 34 and rolling the pet carrier 20 in forward direction 29.

In terms of use, pet carrier 20 is placed on a support surface 500, and a pet is placed in the carrier. Handle 34 is then pivoted until it is at a desired height above the support surface 500. Handle 34 and support arms 31 are then locked in place using locking device 35. A user then lifts handle 34 and rolls pet carrier 20. In a preferred embodiment, handle 34 is positioned slightly below the level of the grip of a standing user, so that when the user straightens up, the feet 40 will be lifted a small distance off of the support surface.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A pet carrier, comprising:
   a cage-like enclosure having a top and an opposite bottom;
   said cage-like enclosure having a front end and an opposite rear end;
   exactly two wheels connected to said cage-like enclosure, said two wheels spaced apart and connected near both said rear end and said bottom;

a handle pivotally connected to said cage-like enclosure near both said front end and said top; and, said handle selectively lockable in a plurality of angular positions.

2. A pet carrier according to claim 1, further including:

said plurality of angular positions ranging from about vertical to about 60° forward of vertical.

3. A pet carrier according to claim 2, further including:

said plurality of angular positions being in equal angular increments.

4. A pet carrier according to claim 1, further including:

said plurality of angular positions ranging from about vertical to about 60° forward of vertical;

two spaced feet disposed on said bottom near said front end, said feet each having a forward-facing bevel;

said two wheels and said two feet each extending downward from said bottom a substantially equal distance; and, at least one attachment device disposed on said cage-like enclosure for securing said pet carrier to a support structure.

5. A pet carrier, comprising:

a cage-like enclosure having a top and an opposite bottom;

said cage-like enclosure having a front end and an opposite rear end;

two spaced wheels connected to said cage-like enclosure near both said rear end and said bottom;

a handle pivotally connected to said cage-like enclosure near both said front end and said top;

said handle selectively lockable in a plurality of angular positions; and, two spaced feet disposed on said bottom near said front end, said feet each having a forward-facing bevel.

6. A pet carrier according to claim 5, further including:

said two wheels and said two feet each extending downward from said bottom a substantially equal distance.

7. A method for transporting a pet, comprising:

providing a pet;

providing a pet carrier including a cage-like enclosure having a top and an opposite bottom, a front end and an opposite rear end, two spaced wheels connected to said cage-like enclosure near both said rear end and said bottom, a handle pivotally connected to said cage-like enclosure near both said front end and said top, said handle selectively lockable in a plurality of angular positions, and two spaced feet disposed on said bottom near said front end, said feet each having a forward-facing bevel;

providing a support surface;

placing said pet carrier on said support surface so that said pet carrier sits on said two spaced wheels and said two spaced feet;

placing said pet in said pet carrier;

pivoting said handle until said handle is at a height above said support surface;

locking said handle in place; and, lifting said handle and rolling said pet carrier.

8. The method according to claim 7, further including:

said height being below a grasp of a hand of a standing user with an arm fully downwardly extended.

9. The method according to claim 8, further including:

said height being about one-half to two inches below said grasp of a hand of a standing user with an arm fully downwardly extended.

10. The method of claim 7, further including:

when said handle is lifted, said two spaced feet coming of off said support surface.

* * * * *